US011109585B2

(12) United States Patent
Serrat et al.

(10) Patent No.: US 11,109,585 B2
(45) Date of Patent: Sep. 7, 2021

(54) AGRICULTURAL SPRAYING CONTROL SYSTEM (71) Applicant: BILBERRY SAS, Gentilly (FR)

(72) Inventors: Hugo Serrat, Saintcloud (FR); Jules Beguerie, Massy (FR); Guillaume Jourdain, Antony (FR)

(73) Assignee: BILBERRY SAS, Gentilly (FR)

( * ) Notice: Subject to any disclaimer, the term of this patent is extended or adjusted under 35 U.S.C. 154(b) by 0 days.

(21) Appl. No.: 16/485,504

(22) PCT Filed: Feb. 22, 2018

(86) PCT No.: PCT/IB2018/051120
§ 371 (c)(1),
(2) Date: Aug. 13, 2019

(87) PCT Pub. No.: WO2018/154490
PCT Pub. Date: Aug. 30, 2018

(65) Prior Publication Data
US 2020/0045953 A1 Feb. 13, 2020

(30) Foreign Application Priority Data

Feb. 24, 2017 (FR) ...................... 1751521

(51) Int. Cl.
*A01M 7/00* (2006.01)
*A01M 9/00* (2006.01)
*G06K 9/62* (2006.01)
*G06K 9/00* (2006.01)
*G06K 9/78* (2006.01)
(Continued)

(52) U.S. Cl.
CPC ........ *A01M 7/0089* (2013.01); *A01M 7/0042* (2013.01); *A01M 7/0057* (2013.01);
(Continued)

(58) Field of Classification Search
CPC .............. A01M 7/0089; A01M 7/0042; A01M 7/0057; A01M 7/0092
See application file for complete search history.

(56) References Cited

U.S. PATENT DOCUMENTS 5,246,164 A * 9/1993 McCann .............. A01B 79/005
239/11
5,278,423 A * 1/1994 Wangler .............. A01M 7/0089
250/559.4
(Continued)

FOREIGN PATENT DOCUMENTS

DE 202014002338 U1 5/2014
EP 1521885 A1 * 4/2005 ............. E01H 11/00
(Continued)

OTHER PUBLICATIONS

Lee, Won Suk, D. C. Slaughter, and D. K. Giles. "Robotic weed control system for tomatoes." Precision Agriculture 1.1 (1999): 95-113.

*Primary Examiner* — John B Strege
(74) *Attorney, Agent, or Firm* — Leason Ellis LLP (57) ABSTRACT A control system for agricultural spraying is especially intended to be connected to an agricultural machine comprising a spraying ramp and having at least one spraying nozzle selectively activatable to spray an agricultural product. The system includes a set of cameras (42) suitable for being secured to the spraying ramp to acquire images (51) of the ground (12) on which the agricultural machine moves (10), a measuring system (59) for determining, in real time, distance information between a camera (42) and the ground (12), and a processing unit (44) communicating with the cameras (42) and said measurement system (59), the processing unit (44) being suitable for selectively controlling the spraying nozzles (34). The processing unit (44) is suitable for:

(Continued)

identifying a target plant (15) in a ground image (51) received from a camera (42);

determining information on the position of the target plant (15) in the image (51); on the basis of distance information between the camera (42) in question and the ground, of the orientation of its viewing axis, of a speed of advance of the agricultural machine and of said information on the position of said target plant (15) in the image (51), selecting at least one nozzle (34) to be activated to spray the target plant (15) with the agricultural product (26); determining an activation time of the or each selected nozzle; and transmitting an activation command to the or each nozzle (34) to trigger the spraying of said target plant (15).

18 Claims, 6 Drawing Sheets

(51) Int. Cl.
  *G06T 7/00* (2017.01)
(52) U.S. Cl.
  CPC ....... *A01M 9/0092* (2013.01); *G06K 9/00657* (2013.01); *G06K 9/00791* (2013.01); *G06K 9/627* (2013.01); *G06K 9/78* (2013.01); *G06T 7/0004* (2013.01)

(56) References Cited

U.S. PATENT DOCUMENTS

| | | | | |
|---|---|---|---|---|
| 6,389,785 | B1* | 5/2002 | Diekhans | A01B 69/001 172/4.5 |
| 7,263,210 | B2* | 8/2007 | Kummel | A01M 7/0089 382/110 |
| 7,463,751 | B2* | 12/2008 | Farina | G01N 21/47 239/692 |
| 8,437,498 | B2* | 5/2013 | Malsam | A01G 25/16 239/71 |
| 2009/0226036 | A1* | 9/2009 | Gaal | A01M 7/0089 382/103 |
| 2015/0245565 | A1* | 9/2015 | Pilgrim | A01G 7/06 280/79.2 |
| 2016/0286780 | A1* | 10/2016 | Leeb | A01M 7/0057 |
| 2017/0039425 | A1* | 2/2017 | Itzhaky | G06K 9/00657 |
| 2017/0223947 | A1* | 8/2017 | Gall | A01M 7/0089 |
| 2019/0147249 | A1* | 5/2019 | Kiepe | G06K 9/00671 382/110 |

FOREIGN PATENT DOCUMENTS

| | | |
|---|---|---|
| WO | 2012032245 A1 | 3/2012 |
| WO | 2012122988 A1 | 9/2012 |

* cited by examiner

AGRICULTURAL SPRAYING CONTROL SYSTEM

CROSS-REFERENCE TO RELATED PATENT APPLICATIONS

This application is a U.S. National Stage Application under 35 U.S.C. § 371 of International Patent Application No. PCT/IB2018/051120, filed Feb. 22, 2018, which claims the benefit of priority under 35 U.S.C. § 119 of French Patent Application number 1751521 filed Feb. 24, 2017, both of which are incorporated by reference in their entireties. The International Application was published on Aug. 30, 2018, as International Publication No. WO 2018/154490 A1.

TECHNICAL FIELD

The present invention relates to systems for spraying agricultural products, and more particularly to those that are connectable to motor vehicles or are integrated in said vehicles.

PRIOR ART

Agricultural fields require regular maintenance whether for fertilizing the soil, controlling weeds, or treating crops against disease and pests. Modern crop production techniques use crop dusters which apply fertilizers or phytosanitary products. The crop dusters can be attached to a motor vehicle which moves in crop fields, or even to an aircraft. These crop dusters traditionally have a field of action that is wide and not very precise. More fertilizer than necessary is often sprayed onto the crops. Herbicide is sometimes also sprayed in part onto the crops instead of only targeting weeds.

Therefore, techniques have been developed for targeting the plants to be treated during spraying. One of these techniques involves using a drone, as described in DE202014002338U1.

However, this mode of detection is not very precise and leads to overuse of spraying products.

Moreover, WO2012/032245A1 discloses a spray control system including a set of spray nozzles, means for mapping plants to be treated using, in one embodiment, cameras, and means for directing the spreading based on the mapping data.

This system also includes means for measuring the slope of the spray boom with respect to the horizontal so as to compensate, if necessary, for the feed pressure of the nozzles.

The dissertation "*Segmentation d'images pour la localisation d'adventices. Application à la réalisation d'un système de vision pour une pulvérisation spécifique en temps réel*" ["*Segmenting images for locating weeds. Application to the production of a vision system for specific spraying in real time*"], Jérémie Bossu, University of Burgundy/CNRS 5158, Dec. 4, 2007, also discloses an experimental spray control system including a camera mounted on the front of a tractor at a fixed height with respect to the ground. A central processing unit is capable of determining the time at which the spraying should be carried out by taking into account the height of the camera, the slope of its line of sight, the speed of movement of the system and the position of plants to be treated in the image.

SUMMARY OF THE INVENTION

The present invention aims to provide a spray control system in which images supplied by a plurality of cameras can be used while determining spraying times in a precise and reliable manner, in order to thus limit the quantity of product applied to that which is necessary.

According to a first aspect, the invention thus provides a system for controlling the spraying of agricultural product, which system is specifically intended to be mounted on a spray boom of an agricultural machine, the spray boom comprising a set of spray nozzles that are selectively activatable to spray an agricultural product, the system including:
 a set of cameras suitable for being secured to the spray boom for capturing images of the ground on which the agricultural machine moves;
 a measuring system for determining, in real time, information regarding the distance of the cameras from the ground; and
 a processing unit communicating with the cameras and said measuring system, the processing unit being suitable for selectively controlling the spray nozzles, during operation the processing unit being capable of:
  identifying a target plant in a ground image received from a camera;
  on the basis of information regarding the current distance of the camera in question from the ground, regarding the direction of observation of the target plant and regarding a ground speed of the agricultural machine, selecting at least one nozzle to be activated in order to spray the agricultural product onto the target plant; determining an activation time of the or each selected nozzle; and transmitting an activation command to the or each nozzle to trigger the spraying of said target plant.

In optional embodiments, the system includes the following additional features, taken individually or in any combinations that a person skilled in the art would consider to be technically compatible:
 the measuring system includes at least one sensor for measuring a distance between the boom and the ground at a given point on the boom that is laterally spaced from an axis of the machine.
 the or each distance sensor is based on the echo of a transmitted wave and is suitable for being secured to the spray boom so as to determine primary information regarding the position of the spray boom.
 the measuring system further includes an inertial navigation system suitable for being secured to the spray boom, the inertial navigation system comprising at least one accelerometer and being capable of capturing at least one additional piece of information regarding the position of the spray boom, in particular information regarding the slope of the boom with respect to a vertical direction of gravity and/or information regarding the change in position of the spray boom.
 the processing unit is suitable for combining the primary information regarding the position of the spray boom captured by the or each distance sensor with the additional information regarding the position of the spray boom captured by the inertial navigation system and for generating information regarding the distance of each camera from the ground without influence from the presence of plants between said distance measuring system and the ground.
 the information regarding the direction of observation of the target plant is obtained from an orientation of the line of sight of the camera and from information regarding the position of the target plant in the image taken by the camera.

the line of sight of the camera is oriented obliquely down toward the front of the system with respect to its direction of movement.

the line of sight of the camera is oriented vertically.

the activation time t2 of a nozzle located directly over a target plant to be treated is determined based on the following formula:

$$t2=t1+d/S$$

where t1 is the time that the shot of the image containing the target plant is taken, d is the horizontal distance between the target plant and the vertical projection of the nozzle, determined from the direction of observation of the target plant, the current height h of the camera with respect to the ground and information regarding the relative position between the camera and the nozzle, and S is the speed of movement of the system.

According to a second aspect, the invention provides a method for controlling a spray nozzle of a spray boom of an agricultural machine, the method comprising the following steps:

capturing an image of the ground on which an agricultural machine moves by means of a camera mounted on the spray boom;

determining, in real time, information regarding the distance of said camera from the ground using information supplied by a measuring system;

receiving the ground image taken by said camera and said information regarding the distance of said camera from the ground;

identifying in said ground image, by processing said image, a target plant to be treated;

determining information regarding the direction of observation of said target plant in said image;

determining, from said information regarding the direction of observation, at least one spray nozzle selected for spraying an agricultural product onto the target plant and, from the information regarding the distance of the camera from the ground, a time at which the or each selected spray nozzle has to be activated in order to spray the agricultural product onto the target plant.

In optional embodiments, the method includes the following additional features, taken individually or in any combinations that a person skilled in the art would consider to be technically compatible:

the method includes the following step:

transmitting an activation command suitable for being received by the or each selected spray nozzle at the time at which the or each selected spray nozzle has to be activated in order to trigger the spraying of the agricultural product onto said target plant.

the step of capturing, in real time, information regarding the distance of said camera from the ground includes the following steps:

capturing primary information regarding the position of the spray boom by means of a distance sensor of said measuring system;

capturing additional information regarding the position of the spray boom by means of an inertial navigation system of said measuring system;

combining the primary information regarding the position of the spray boom with the additional information regarding the position of the spray boom to generate information regarding the distance of each camera from the ground without influence from the presence of plants between said distance measuring system and the ground.

the information regarding the direction of observation of the target plant is obtained from an orientation of the line of sight of the camera and from information regarding the position of the target plant in the image taken by the camera.

the line of sight of the camera is oriented obliquely down toward the front of the system with respect to its direction of movement.

the line of sight of the camera is oriented vertically.

the activation time t2 of a nozzle located directly over a target plant to be treated is determined based on the following formula:

$$t2=t1+d/S$$

where t1 is the time that the shot of the image containing the target plant is taken, d is the horizontal distance between the target plant and the vertical projection of the nozzle, determined from the direction of observation of the target plant, the current height h of the camera with respect to the ground and information regarding the relative position between the camera and the nozzle, and S is the speed of movement of the boom.

The invention further provides an agricultural machine including:

a spray boom comprising:
a bar extending in a lateral direction; and
a plurality of spray nozzles mounted on the bar and distributed in the lateral direction; and a control system as defined above, in which:
the cameras and the distance measuring system are secured to the bar of the spray boom; and
the processing unit communicates with the plurality of spray nozzles of the spray boom in order to transmit, during operation, the activation command suitable for being received by the plurality of spray nozzles in order to trigger the spraying of the agricultural product onto said at least one target plant.

In optional embodiments, the machine includes the following additional features, taken individually or in any combinations that a person skilled in the art would consider to be technically compatible:

the line of sight of the camera is oriented obliquely down toward the front of the machine.

the line of sight of the camera is oriented vertically.

each camera is associated with a particular given subset of the plurality of nozzles.

BRIEF DESCRIPTION OF THE DRAWINGS

Other characteristics and advantages will become apparent from the following description of one of these embodiments, given by way of non-limiting example with reference to the accompanying drawings, in which.

In the various figures, identical or similar elements may be denoted by the same reference signs.

DETAILED DESCRIPTION

In the present description, the spatial concepts will be described with respect to a direction D of movement of an agricultural vehicle operating traditionally. Thus, a point A is in "front" of a point B in the direction D of movement when the agricultural vehicle passes chronologically first through point A and then through point B in the direction D of movement.

Figure 1:
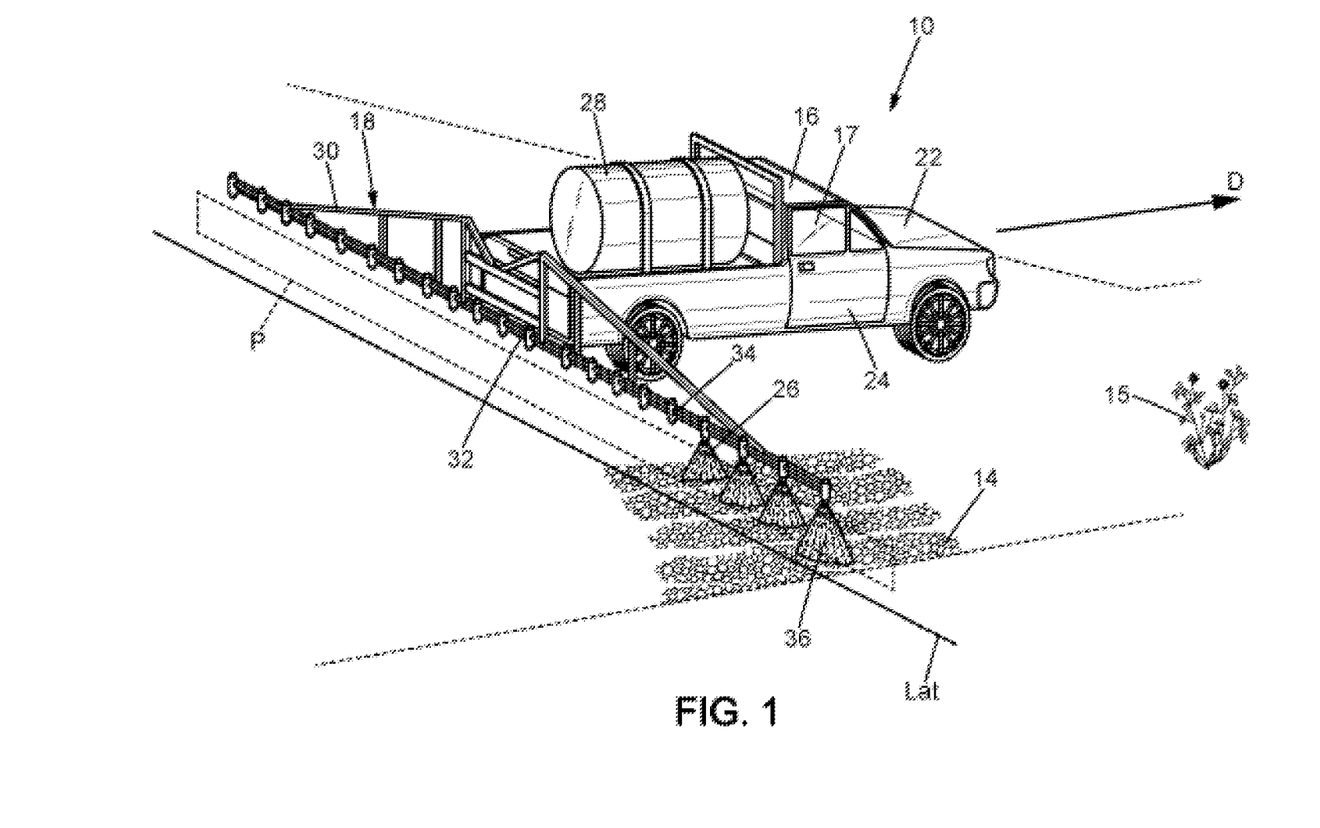
FIG. 1 is a schematic perspective view of an agricultural spraying machine in an agricultural field.

With reference to FIG. 1, an agricultural spraying machine, or agricultural machine, 10, moves in a direction D on an agricultural field or the ground 12. The agricultural field 12 contains plants 14 to be treated. These plants 14 may be, for example, weeds to be controlled or even crops to be fertilized. The agricultural spraying machine 10 includes a motor vehicle 16 of the tractor type on which a spray boom 18 is mounted. The vehicle 16 is operated by a conductor, typically an agricultural worker, from a cabin 17 of the vehicle 16. However, it is envisaged that the vehicle 16 is entirely automated, and possibly operated from a station outside the vehicle 16. The vehicle 16 may also be an agricultural robot which may or may not have nozzles placed on a spray boom; the boom may or may not be integrated in the robot.

In the embodiment illustrated in FIG. 1, the spray boom 18 is mounted at the back 20 of the vehicle 16. It is contemplated that the boom 18 may be mounted on a trailer connected to the vehicle 16. However, the spray boom 18 may be located on a different part of the vehicle 16. For example, said boom may be mounted on the front 22 of the tractor or on the sides 24 of the vehicle 16. Alternatively, the spray boom 18 may be located on a trailer (not shown) of the vehicle 16, which trailer is secured and towed by a tractor of the vehicle 16; said trailer may or may not be motor-driven. The spray boom 18 is supplied with agricultural treatment product 26 by a container 28 which contains a solution of agricultural product 26 and is arranged on the vehicle 16. It is contemplated that the container 28 may alternatively be arranged on the boom 18, or on a trailer including the boom 18. The agricultural product 26 is typically an herbicide or a fertilizer. Other examples of agricultural product include, non-exhaustively, fungicide, growth regulators and insecticides. The type of product selected depends on the type of plant 14 to be treated. For example, if the plant 14 is a weed, the product 26 sprayed will be an herbicide. In one embodiment, the spray boom 18 is supplied with a single type of agricultural product 26. In another embodiment, the spray boom 18 is supplied with a plurality of types of product, of the same type or of different types, simultaneously or sequentially. For this purpose, the tractor 16 may thus have a plurality of containers 28 which would each contain a solution of agricultural product 26. In one embodiment, the container 28 is initially a water tank to which the agricultural product(s) 26 is/are added (possibly via one (or more) auxiliary containers) before the start of or during the spraying.

Still with reference to FIG. 1, the spray boom 18 extends in a lateral direction Lat that is generally perpendicular to the direction D of movement of the agricultural machine 10. It may be envisaged that the spray boom 18 extends in a different direction, i.e. at an angle other than 90 degrees between the lateral direction Lat and the direction D of movement. It is also envisaged that the spray boom 18 may have a variable position with respect to the vehicle 16.

The boom 18 is formed of a frame 30 having a generally triangular shape, for example in a plane formed by the vertical direction V and the lateral direction Lat. The frame 30 includes a lower bar 32 which extends in the lateral direction Lat and which is generally horizontal and parallel with respect to the agricultural field 12. The boom 18 is rigid and made of metal, metal alloy or composite materials. In one embodiment, the boom 18 is non-articulated. However, in another embodiment, the boom may be articulated in order to move from a retracted position into a deployed position depending on whether or not the boom 18 is in use, or if spraying is desired on just one portion that is smaller than the suitable portion when the boom 18 is opened out. In the embodiment shown in FIG. 1, the boom 18 is suspended from the vehicle 16 so as not to touch the field 12. However, in another embodiment it is possible for the boom 18 to have shoes or wheels in contact with the field 12. In addition, although a single boom 18 is shown attached to a vehicle 16 in FIG. 1, it is possible for the vehicle 16 to include a plurality of booms 18. These booms 18 may be mounted at the same location on the vehicle 16, for example all on the back 20, or at different locations, for example one on the front 22 and one on the back 20.

The bar 32 includes a plurality of spray nozzles 34 mounted on the bar 32 and distributed in the lateral direction Lat. The nozzles 34 are in fluid communication with the container 28. In a direction Dir that is generally perpendicular to the ground 12), each nozzle 34 diffuses the agricultural product 26 in the form of droplets over a field of action 36 that is generally conical and is unique thereto. The number of nozzles 34 on the bar 32 depends on the width of the field of action 36 of each nozzle on the agricultural field 12. Since it is desirable to spray agricultural product 26 over a portion P of the agricultural field 12 that is swept by an agricultural spraying machine 10, in one embodiment there is a number of nozzles 34 along the bar 32 such that fields of action 36 are mutually contiguous. However, the fields of action 36 of the nozzles 34 may not be contiguous and may have a space between them. This space is preferably kept as small as possible. In another embodiment, there is a partial overlap of the fields of action 36 of the nozzles 34. In an embodiment given by way of a purely non-limiting example, the nozzles 34 are spaced 50 cm apart from one another along a bar 32 that is 36 m in length.

Figure 2:
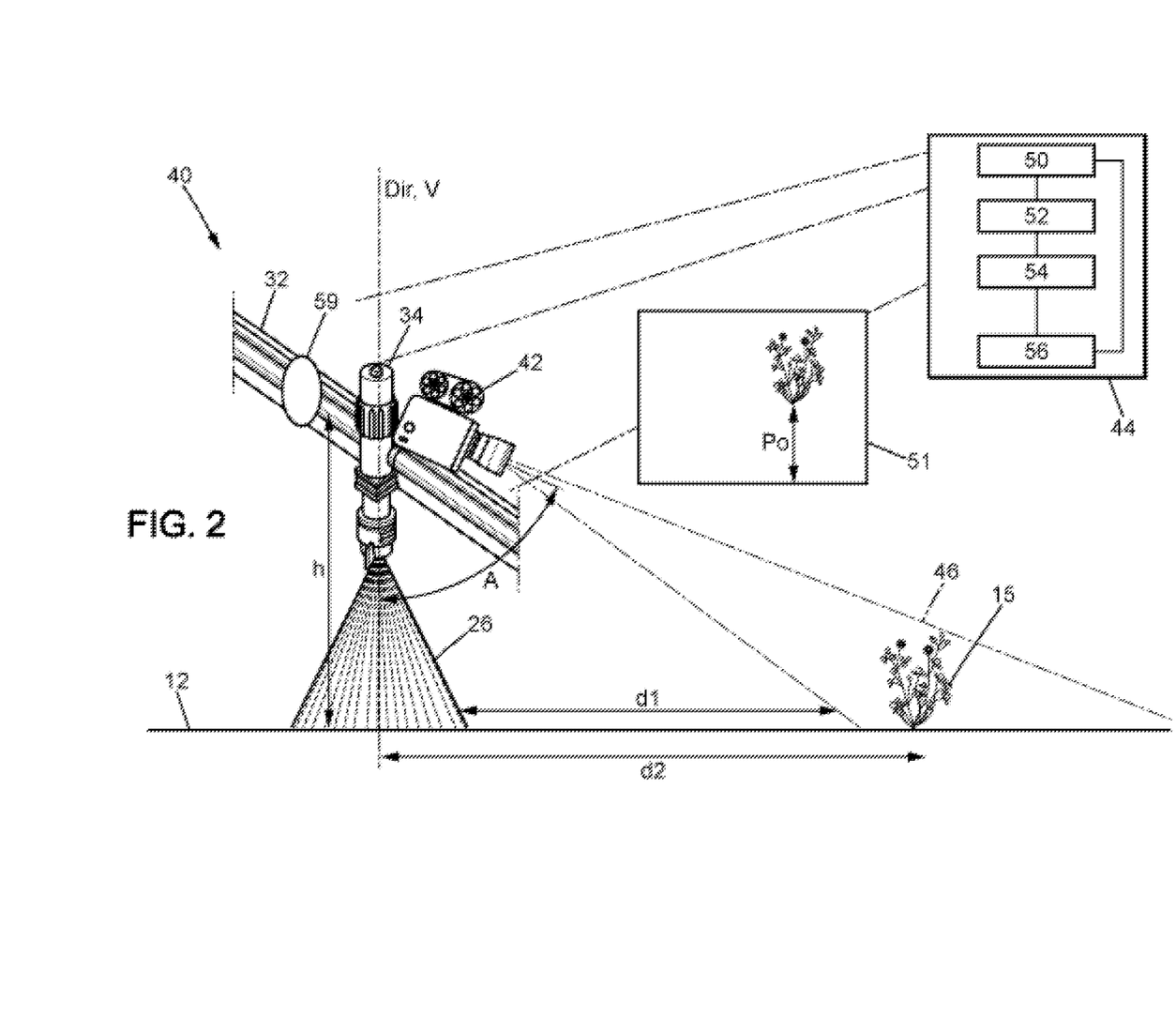
FIG. 2 is a schematic representation of a system for controlling the spraying of agricultural product, according to an embodiment, suitable for being mounted on the agricultural machine from FIG. 1.

With reference now also to FIG. 2, a system 40 for controlling the spraying of the agricultural product 26 will now be described. This system 40 may be delivered in the form of a kit and mounted on the spray boom 18 once the agricultural machine 10 has been purchased, or be installed directly at the factory onto the spray boom 18 before said boom has been delivered in order to be connected to the vehicle 16. The system 40 makes it possible to detect at least one position of target plants 15 in order to target the spraying of the agricultural product 26 on said plants. This targeting thus makes it possible to reduce wastage of the agricultural product 26 and also to avoid spraying the plants 14 that are not intended to be sprayed by the agricultural product 26. This is the case for example during weed control, where it is not favorable to spray crops with herbicides, but rather just the weeds. It is contemplated that the system 40 may have features for detecting the state of health of the target plant 15, for example for reasons of fertilization.

The system 40 includes a plurality of cameras 42 and a processing unit 44, which is connected to the cameras 42 in order to collect and process the data from the plurality of cameras 42, and thus control the action of the nozzles 34 based on the information supplied by the cameras 42 (i.e. whether or not a target plant 15 is present in the field of action of the nozzles 34 when said nozzles are vertically above the target plant 15). The nozzles 34 will be activated by the processing unit 44 in order to spray the target plant 15 identified by the cameras 42 (and not activated if there is no target plant in the field of action of the nozzles 34). In one embodiment, the system 40 includes a single camera 42 and/or a plurality of processing units 44. In addition, in another embodiment, the system 40 includes a plurality of control sub-systems, each sub-system including a camera 42 and a processing unit 44 associated with one or more nozzles 34. In one embodiment, each camera 42 is associated with a nozzle 34. In one embodiment, a plurality of nozzles 34 are associated in groups to one of the cameras 42, optionally mutually exclusively. The cameras 42 can be physically connected to the processing unit 44 by cables or in a wireless manner. Similarly, the processing unit 44 may control the nozzles 34 via electrical cables or wirelessly. The cameras 42 are, for example, optical cameras, for example cameras having a resolution of a few megapixels. The cameras 42 can comprise lenses for adjusting the field of view 46 and/or extending said field of view 46 in the forward direction of the vehicle 16. Alternatively, linear cameras can be used. Advantageously, the data generated by linear cameras of this kind are thus processed or formatted in order to obtain an image in the form of a square or rectangular pixel matrix, each pixel corresponding to a zone in the field of view of a camera.

Figure 3:
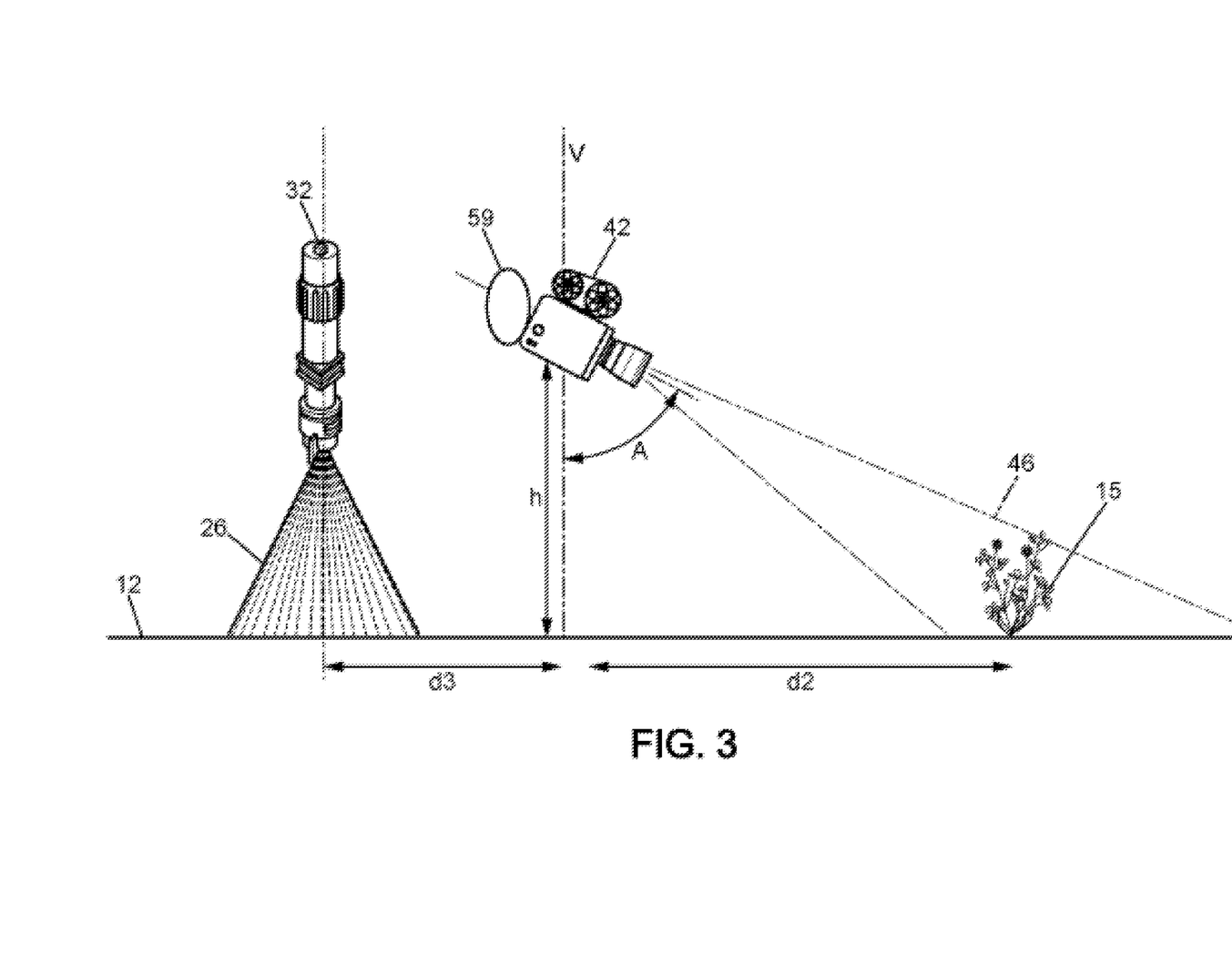
FIG. 3 is a schematic representation of another embodiment of the system for controlling the spraying of agricultural product.
Figure 4:
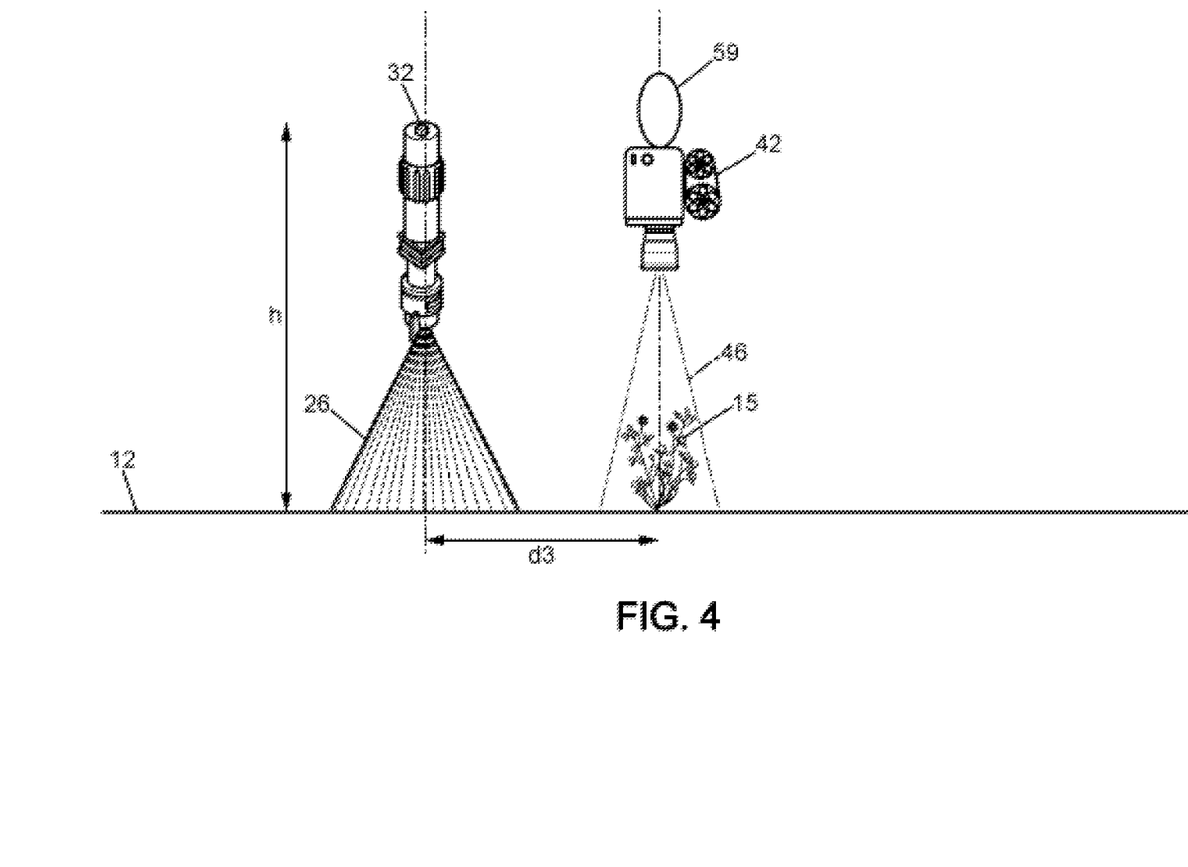
FIG. 4 is a schematic representation of another embodiment of the system for controlling the spraying of agricultural product.

With additional reference to FIGS. 3 and 4, the cameras 42 can be positioned in a variety of ways relative to the nozzles 34. The cameras 42 can be installed on the spray boom 18, in particular on the bar 32 containing the nozzles 34, as illustrated in FIG. 2, or in front of the nozzles 34 (either on the same spray boom 18 or on a different one) with respect to the direction D of movement, as illustrated in FIG. 3. The cameras 42 can be oriented so as to have their fields of view 46 perpendicular to the ground 12. This embodiment could be implemented in particular in combination with a position of the cameras 42 in front of the nozzles 34, as illustrated in FIG. 4. However, as illustrated in FIGS. 2 and 3, the cameras 42 are preferably oriented at an angle A that is not perpendicular with respect to the ground 12 (i.e. a non-zero angle with respect to a vertical line V which is also a spray direction Dir of the nozzles 34) such that the fields of view 46 are in front of the fields of action 36 of the nozzles 34 (i.e. the field of view 46 and the field of action 36 being at a distance d1 from one another on the ground 12), allowing detection of the target plant 15 then spraying by the nozzles 34 to occur sequentially. In one embodiment, there is a number of cameras 42 such that the fields of view 46 of the cameras 42 are mutually contiguous in the lateral direction Latin order to visually cover the portion P of the agricultural field 12 that will be swept by the spray boom 18. However, the fields of view 46 of the cameras 42 may not be contiguous and may have a space between them. This space is preferably kept as small as possible. In another embodiment, there is a partial overlap of the fields of view 46 of the cameras 42. There may be as many cameras 42 as nozzles 34 if the fields of view 46 of the cameras 42 overlap the fields of action 36 of the nozzles 34. In this case, the cameras 42 would be positioned in the same lateral position of the nozzles 32. However, there may also be no correlation between the number of cameras 42 and the number of nozzles 34, as long as the fields of vision 46 and fields of action 36 together cover the portion P of the field 12.

According to another embodiment (not shown), cameras having a generally vertical line of sight can be provided that are mounted on the boom and thus adjacently to the nozzles with respect to the direction of movement of the system. These cameras have a field of view that is sufficiently large to be able to detect target plants located sufficiently upstream of the boom with respect to its direction of movement. It is understood that in this case only the part of the image corresponding to this upstream direction is used. The direction of observation of the target plant is achieved in this case simply from the position of the target plant in the image.

For the sake of clarity, and with reference to FIG. 2, the system 40 will be described with reference to a camera 42 associated with a nozzle 34 and communicating with a processing unit 44. However, as discussed above, the camera 12 may be associated with a plurality of nozzles 34, and the processing unit 44 receives the information coming from a plurality of cameras 42.

The processing unit 44 includes a plurality of modules, including:

a communication module 50 communicating, with one or more of the cameras 42 and a distance measuring system 59 (described below), information regarding the distance h of the camera 42 from the ground 12. At a time t1, the communication module 50 receives an image 51 of a portion of the field 12 provided in real time by each camera 42 and information regarding the distance h of the camera 42 with respect to the ground 12 (for example the height h of the camera 42 with respect to the ground 12 (it being possible for the ground 12 to be bare ground as illustrated or ground covered with low vegetation);

an image processing module 52 communicating with the communication module 50. The image processing module 52 identifies the possible presence of at least one target plant 15 in the image 51 and determines a spatial position (information regarding the position Po) of this target plant 15 in the image 51 (information regarding the position Po would be, for example, the determination of at least one coordinate of the target plant 15 in the direction Latin which the nozzles 34 are aligned). Optionally, in order to correct the field of view 46 of the cameras 42 when the spray boom 18 has a variable height with respect to the ground 21, the image processing module 52 determines information regarding the position of said at least one target plant 15 from the ground 12 using the information regarding the distance of said at least one camera 42 from the ground 12;

a calculation module 54 communicating with the image processing module 50 and the communication module 52. The calculation module 54 determines, from the information regarding the position Po of this target plant 15 in the image 51, which nozzle 34 should be actuated in order to reach the target plant 15 and, from the information regarding the distance h of the camera 42 with respect to the ground 12, a time t2 at which the spraying via the selected nozzle(s) 34 should take place in order to reach the target plant 15; and a control module 56 communicating with the calculation module 54. The control module 56 transmits the indication of the activation of the selected nozzle(s) 34 at the time t2 to the nozzle(s) 34 which will be located vertically above the target plant(s) 15 at the time t2.

The processing unit 44 can be in the form of a computer or a calculation unit comprising one or more processors or CPUs as well as one or more memories. The processing unit 44 can moreover comprise parallel processing units such as GPUs or multi-core processors, so as to accelerate the processing of the images. The processing unit 44 can be provided in the form of an individual unit or be split into a plurality of separate, intercommunicating elements. Advantageously, the set of modules of the processing unit 44 (communication modules 50, image processing modules 52, calculation modules 54, control modules 56) are suitable for being mounted on the vehicle 16 so as to limit or avoid communication with remote elements which can slow down the operation of the system and thus even reduce its maximum operating speed.

At the time t1, the cameras 42 film a portion of the field 12 corresponding to their field of view 46 (preferably said portion is located in front of the nozzles 34). The information collected (image 51) is transmitted to the processing unit 44 via the communication module 50. An algorithm in the image processing module 52 makes it possible to derive from the collected image 51 whether there is a target plant 15 in the filmed portion of the field 12 and, optionally, if the fields of action 36 cannot overlap the fields of view 46, the position of the target plant 15 (at least in the direction Lat in which the nozzles 34 are aligned). This can be achieved for example by comparing the different colors of the image 51 (color of the plant compared with the color of the ground), or pixel densities of the image 51 (it being possible for the target plant 15 to be lighter or darker compared with the ground). Alternatively, the target plant 15 can be identified by implementing a shape recognition algorithm, for example an algorithm using learning techniques, in particular using neural networks. An algorithm of this kind can involve a first learning phase, performed on a set of labeled learning data and making it possible to determine the parameters or weight of a function for calculating a probability of the presence of a plant of each given species at each position of the image. In one embodiment, the image processing module 51 can determine the presence of a plurality of target plants 15 in the field of view 46, as well as distinguish between different types of plants. The image processing module 51 may also determine more than one characteristic. For example, the image processing module 51 may not only determine a target plant 15 but also a condition relating to the target plant 15 (presence of insects, presence of holes or spots on the foliage, for example). Based on these characteristics, the selection of the spray product could be adjusted.

If there is a target plant 15 present at a time t1, the processing unit 44 determines, via the calculation module 54, the time t2 at which the spraying should take place. The time t2 corresponds to the time at which the nozzle(s) 34 activated for spraying are located vertically adjacent to and above the target plant 15, i.e. when the fields of action 36 of the activated nozzle(s) 34 overlap the target plant 15. Since the field of view 46 of the camera 42 is in front of the field of action 26 of the nozzle 34, the times t1 and t2 are different. The difference between the times t1 and t2 is, for example, several tens of seconds, milliseconds or hundreds of milliseconds. In one embodiment, however, the difference between these two times could be smaller than the values given above. In the event of a plurality of nozzles 34 being associated with the camera 42, the processing unit 44 determines which nozzle 34 or group of nozzles 34 should be activated to spray the target plant 15. Once the spatial position of the target plant 15 is known, the processing unit 44 selects to activate, as well as the nozzle (or nozzles) 34 which will pass over, the target plant 15 at the time t2.

In order to determine this time t2, the calculation module 54 takes into account the speed S of movement of the nozzles 34 (which is the speed of movement of the vehicle 16), the height h of the camera 42 with respect to the ground 12, and the direction of observation A' of the target plant (based on the angle A of the line of sight of the camera 42 and on the position of the target plant in the image), based on the equation:

$$t2=t1+d/S$$

where
S is the speed of movement of the system,
d is the horizontal distance between the target plant and the vertical projection of the nozzle, determined as follows:
d=d2=h*tan(A') for the embodiment illustrated in FIG. 2;
d=d3+d2=d3+h*tan(A') for the embodiment illustrated in FIG. 3; and
d=d3 for the embodiment illustrated in FIG. 4 (where the camera has a limited field of view and where A'=A=0 is approximated).

The above equation is a calculation basis, it being possible for other parameters and in particular latencies at different levels of the system to also be taken into account in the actual calculation.

In one embodiment, the spraying does not take place at the time t2. For example, the presence of target plants 15 could firstly be mapped across the whole field 12. Secondly (consecutively or later), the target plants 15 are sprayed based on the mapping previously carried out.

In one embodiment, the height h of the camera 42 is determined in real time by the distance measuring system 59. In one embodiment, the distance measuring system 59 is secured close to the cameras 42. "Close" is understood to mean a distance sufficiently near for the distance measurement carried out by the measuring system 59 to be included in an acceptable error interval with respect to the actual distance between the camera 42 and the ground 12, for example a distance less than 2 m from the camera. Alternatively, the measuring system 59 can also be secured to the agricultural machine 10 so as to have a fixed relative position with respect to the camera, such that the distance of the camera 42 from the ground 12 can be derived from the distance measurement carried out by the measuring system 59, in particular by means of a previous calibration of the relative positions of the measuring system 59 and the camera 42. In another embodiment, if the cameras 42 are secured to the bar 32, the distance measuring system 59 is secured to the bar 32. In one embodiment, the distance measuring system 59 comprises one or more sensors. In one embodiment, a distance sensor is secured to the bar 32 every 2 m 50. In one embodiment, the distance sensors are ultrasonic sensors. In another embodiment, the distance sensors are laser or optical sensors. In another embodiment, the height h of the cameras 42 is determined by a distance measuring system 60 which includes at least one distance sensor 62 and an inertial navigation system 64. The distance measuring system 60 will be described below. In another embodiment, the height h is fixed and determined with respect to the ground 12 when the vehicle 12 is stationary. In one embodiment, the height h is between 30 cm and 2 m. The speed S of movement of the nozzles 34 can be determined by GPS (Global Positioning System), or any other means that is sufficiently precise and rapid to allow the speed to be determined in real time. The GPS can be located on the boom 18 or on the vehicle 16. Since the nozzle 34 has a fixed connection to the vehicle 16, the speed S of movement of the nozzle 34 is the speed of the vehicle 16. In one embodiment, the speed S of movement of the nozzle 34 is between 7 and 25 km/h. The angle A is a fixed angle that is known during installation of the system 40. In one embodiment, the angle A is between 40 and 60 degrees. In another embodiment, the angle A is 50 degrees, as illustrated in FIGS. 2 and 3. In yet another embodiment, the angle A is 0 degrees (i.e. the camera 42 is perpendicular to the field 12), as illustrated in FIG. 4.

Figure 5:
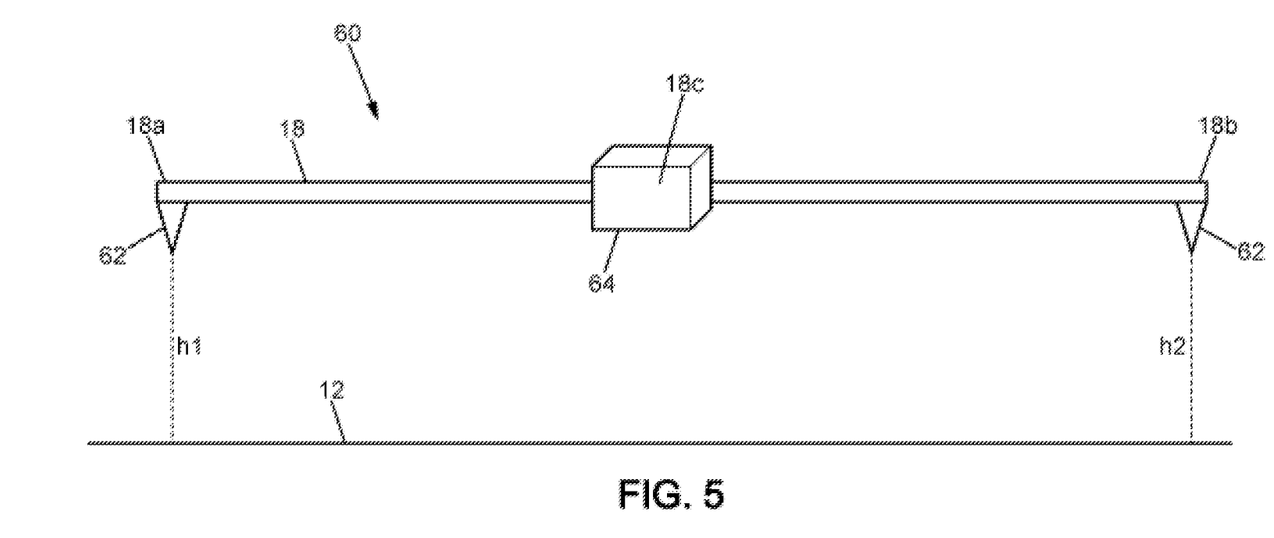
FIG. 5 is a schematic representation of an inertial navigation system for a system for controlling the spraying of agricultural product according to any of FIG. 2 to 4.

With reference now to FIG. 5, the distance measuring system 60 makes it possible to determine, in real time, the distance of the camera 42 with respect to the ground 12 with the camera 42 secured to the boom 18. In one embodiment, the distance measuring system 60 includes two distance sensors 62 positioned at the ends 18a, 18b of the spray boom 18, and an inertial navigation system 64 positioned at the center 18c of the spray boom 18. In one embodiment, the distance sensors 62 are ultrasonic sensors. In another embodiment, the sensors 62 are optical or laser sensors. The distance sensors 62 and the inertial navigation system 64 are connected to the processing unit 44. The distance sensors 62 produce primary information regarding the distance, heights h1 and h2, respectively, of the boom 18 and thus of the cameras 42 with respect to the ground 12. The inertial navigation system 64 includes at least two of: a gyroscope, accelerometer and magnetometer. The inertial navigation system 64 is capable of capturing at least one additional piece of information regarding the position of the spray boom 18, and in particular information regarding the slope of the boom 18 with respect to the gravitational vertical V and/or information regarding the change in position of the spray boom 18.

The calculation module 54 compares the primary heights h1 and h2 with the additional information regarding the position of the spray boom 18 supplied by the inertial navigation system 64 in order to smooth the measurements h1 and h2 of the distance sensors 62, i.e. so as to generate information regarding the height of the cameras 42 from the ground that is independent of the presence of plants between the distance sensors 62 and the ground 12. In the case of dense plants, and a field 12 which would be covered only partially by said plants, the distance sensors 62 could confuse the plant with the ground 12 and give a height which would in fact be a height between the plant and the sensor instead of giving a height between the ground and the sensor. The GPS can also be used as a source of additional information in order to increase the precision of the dynamics of the boom 18.

Figure 6:
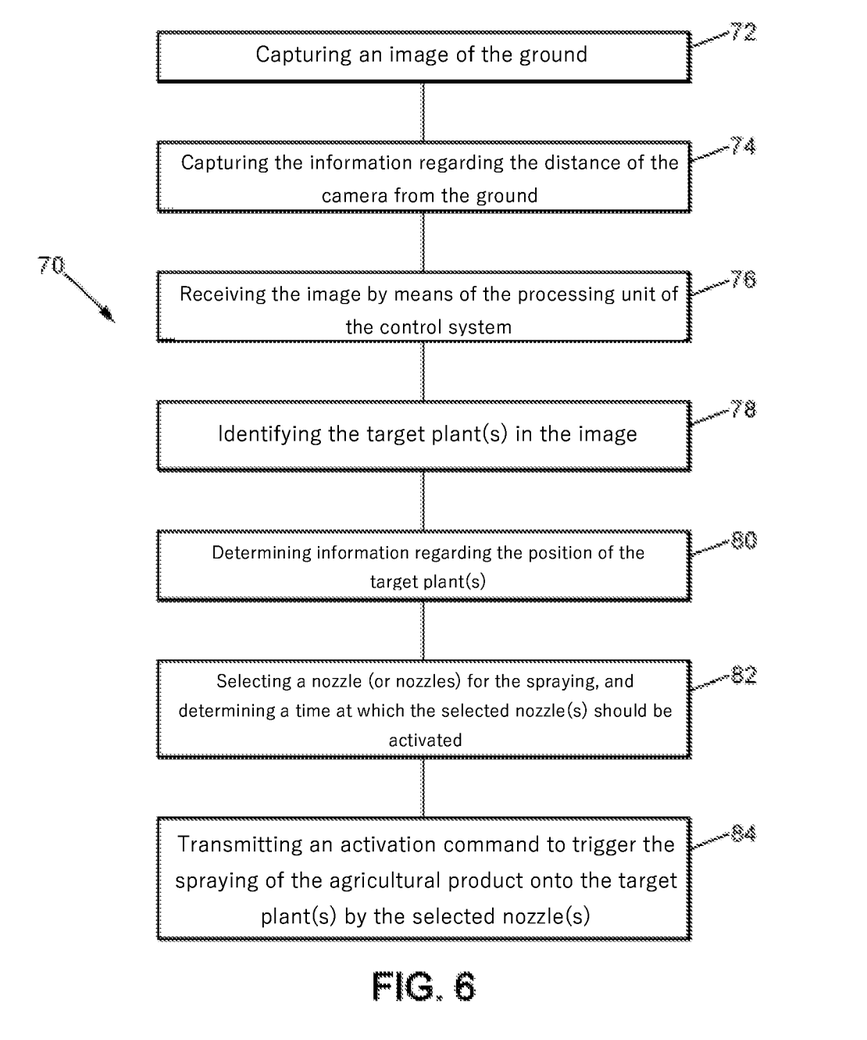
FIG. 6 is a graph showing a method for controlling a spray nozzle implemented by the control system from FIG. 1 to 5.

Thus, with reference to FIG. 6 and taking as a non-limiting example a system having a camera 42 associated with a plurality of nozzles 34, the above-described control system 40 operates according to a method 70 for controlling the selected nozzle(s) 34, comprising the steps (not necessarily carried out in the order given) of:

Step 72: capturing the image 51 of the ground 12 on which an agricultural machine 10 moves by means of the camera 42 of the control system 40 mounted on the agricultural machine 10;

Step 74: capturing, in real time, the information regarding the distance of the camera 42 from the ground h by means of a distance measuring system 59;

Step 76: receiving the image 51 and the information regarding the distance h by means of the communication module 50 of the processing unit 44 of the control system 40;

Step 78: identifying the target plant(s) 15 in the image 51 by means of the image processing module 52 of the processing unit 44;

Step 80: determining the information regarding the position Po of the target plant(s) 15 in the image 51 by means of the image processing module 52 of the processing unit 44;

Step 82: determining, from the information regarding the distance h and from the information regarding the position Po of the target plant(s) 15 in the image 51, a nozzle (or nozzles) 34 selected for the spraying and optionally, by means of the calculation module 54 of the processing unit, 44 the time t at which the selected nozzle(s) 34 should be activated in order to spray the agricultural product 26 onto the target plant(s) 15; and Step 84: transmitting an activation command suitable for being received by the selected spray nozzle(s) 34 in order to trigger the spraying of the agricultural product 26 onto the target plant(s) 15 by means of the control module 56 of the processing unit 44.

The above description is intended to be merely an example, and a person skilled in the art will recognize that modifications can be made to the described embodiments without departing from the scope of the disclosed invention. Other modifications which fall within the scope of the present invention will become apparent to a person skilled in the art from reading this description and such modifications are intended to be included in the accompanying claims.

The invention claimed is:

1. A system for controlling the spraying of agricultural product, which system is specifically intended to be mounted on a spray boom of an agricultural machine, the spray boom comprising a set of spray nozzles that are selectively activatable to spray an agricultural product, the system including:

a set of cameras suitable for being secured to the spray boom for capturing images of the ground on which the agricultural machine moves;

a measuring system for determining information, in real time, regarding the distance of the cameras from the ground; and a processing unit communicating with the cameras and said measuring system, the processing unit being suitable for selectively controlling the spray nozzles, wherein, during operation, the processing unit is capable of:

identifying a target plant in a ground image received from a camera;

on the basis of information regarding the current distance of the camera in question from the ground, regarding the direction of observation of the target plant and regarding a ground speed of the agricultural machine, selecting at least one nozzle to be activated in order to spray the agricultural product onto the target plant; determining an activation time of each selected nozzle; and transmitting an activation command to the or each nozzle to trigger the spraying of said target plant, wherein the information regarding the direction of observation of the target plant is obtained from an orientation of the line of sight of the camera and from information regarding the position of the target plant in the images taken by the camera.

2. The control system according to claim 1, wherein the measuring system comprises at least one sensor for measuring a distance between the boom and the ground at a given point on the boom that is laterally spaced from an axis of the machine.

3. The control system according to claim 2, wherein the or each distance sensor is based on the echo of a transmitted wave and is suitable for being secured to the spray boom so as to determine primary information regarding the position of the spray boom.

4. A system for controlling the spraying of agricultural product, which system is specifically intended to be mounted on a spray boom of an agricultural machine, the spray boom comprising a set of spray nozzles that are selectively activatable to spray an agricultural product, the system including:
a set of cameras suitable for being secured to the spray boom for capturing images of the ground on which the agricultural machine moves;
a measuring system for determining information, in real time, regarding the distance of the cameras from the ground; and
a processing unit communicating with the cameras and said measuring system, the processing unit being suitable for selectively controlling the spray nozzles,
wherein, during operation, the processing unit is capable of:
identifying a target plant in a ground image received from a camera;
on the basis of information regarding the current distance of the camera in question from the ground, regarding the direction of observation of the target plant and regarding a ground speed of the agricultural machine, selecting at least one nozzle to be activated in order to spray the agricultural product onto the target plant; determining an activation time of each selected nozzle; and transmitting an activation command to the or each nozzle to trigger the spraying of said target plant, wherein the measuring system comprises at least one sensor for measuring a distance between the boom and the ground at a given point on the boom that is laterally spaced from an axis of the machine, wherein the or each distance sensor is based on the echo of a transmitted wave and is suitable for being secured to the spray boom so as to determine primary information regarding the position of the spray boom, wherein the measuring system further includes an inertial navigation system suitable for being secured to the spray boom, the inertial navigation system comprising at least one accelerometer and being capable of capturing at least one additional piece of information regarding the position of the spray boom, in particular information regarding the slope of the boom with respect to a vertical direction of gravity and/or information regarding the change in position of the spray boom.

5. The control system according to claim 4, wherein the processing unit is suitable for combining the primary information regarding the position of the spray boom captured by the or each distance sensor with the additional information regarding the position of the spray boom captured by the inertial navigation system and for generating information regarding the distance of each camera from the ground without influence from the presence of plants between said distance measuring system and the ground.

6. The system according to claim 1, wherein the line of sight of the camera is oriented obliquely down toward the front of the system with respect to its direction of movement.

7. The system according to claim 1, wherein the line of sight of the camera is oriented vertically.

8. A system (40) for controlling the spraying of agricultural product (26), which system is specifically intended to be mounted on a spray boom (18) of an agricultural machine (10), the spray boom (18) comprising a set of spray nozzles (34) that are selectively activatable to spray an agricultural product (26), the system (40) including:
a set of cameras (42) suitable for being secured to the spray boom for capturing images (51) of the ground (12) on which the agricultural machine (10) moves;
a measuring system (59) for determining, in real time, information regarding the distance of the cameras (42) from the ground (12); and
a processing unit (44) communicating with the cameras (42) and said measuring system (59), the processing unit (44) being suitable for selectively controlling the spray nozzles (34),
wherein during operation, the processing unit (44) is capable of:
identifying a target plant (15) in a ground image (51) received from a camera (42);
on the basis of information regarding the current distance of the camera (42) in question from the ground, regarding the direction of observation of the target plant and regarding a ground speed of the agricultural machine, selecting at least one nozzle (34) to be activated in order to spray the agricultural product (26) onto the target plant (15); determining an activation time of the or each selected nozzle; and transmitting an activation command to the or each nozzle (34) to trigger the spraying of said target plant, wherein the activation time (t2) of a nozzle located directly over a target plant to be treated is determined based on the following formula:

$$t2=t1+d/S$$

where
t1 is the time that the shot of the image containing the target plant is taken,
d is the horizontal distance between the target plant and the vertical projection of the nozzle, determined from the direction of observation of the target plant, the current height h of the camera with respect to the ground and information regarding the relative position between the camera and the nozzle,
and S is the speed of movement of the system.

9. A method for controlling a spray nozzle of a spray boom of an agricultural machine, the method comprising the following steps:
capturing an image of the ground on which an agricultural machine moves by means of a camera mounted on the spray boom;
determining, in real time, information regarding the distance of said camera from the ground using information supplied by a measuring system;
receiving the ground image taken by said camera and said information regarding the distance of said camera from the ground;
identifying in said ground image, by processing said image, a target plant to be treated;
determining information regarding the direction of observation of said target plant in said image;
determining, from said information regarding the direction of observation, at least one spray nozzle selected for spraying an agricultural product onto the target plant and, from the information regarding the distance of the camera from the ground, a time at which the or each selected spray nozzle has to be activated in order to spray the agricultural product onto the target plant, wherein the information regarding the direction of observation of the target plant is obtained from an orientation of the line of sight of the camera and from information regarding the position of the target plant in the image taken by the camera.

10. The method according to claim 9, further including the following step:
transmitting an activation command suitable for being received by the or each selected spray nozzle at the time at which each selected spray nozzle has to be activated in order to trigger the spraying of the agricultural product onto said target plant.

11. A method for controlling a spray nozzle of a spray boom of an agricultural machine, the method comprising the following steps:
capturing an image of the ground on which an agricultural machine moves by means of a camera mounted on the spray boom;
determining, in real time, information regarding the distance of said camera from the ground using information supplied by a measuring system;
receiving the ground image taken by said camera and said information regarding the distance of said camera from the ground;
identifying in said ground image, by processing said image, a target plant to be treated;
determining information regarding the direction of observation of said target plant in said image;
determining, from said information regarding the direction of observation, at least one spray nozzle selected for spraying an agricultural product onto the target plant and, from the information regarding the distance of the camera from the ground, a time at which the or each selected spray nozzle has to be activated in order to spray the agricultural product onto the target plant, wherein the step of capturing, in real time, information regarding the distance of said camera from the ground includes the following steps:
capturing primary information regarding the position of the spray boom by means of a distance sensor of said measuring system;
capturing additional information regarding the position of the spray boom by means of an inertial navigation system of said measuring system;
combining the primary information regarding the position of the spray boom with the additional information regarding the position of the spray boom to generate information regarding the distance of said camera from the ground without influence from the presence of plants between said distance measuring system and the ground.

12. The method according to claim 9, wherein the line of sight of the camera is oriented obliquely down toward the front of the system with respect to its direction of movement.

13. The method according to claim 9, wherein the line of sight of the camera is oriented vertically.

14. A method for controlling a spray nozzle of a spray boom of an agricultural machine, the method comprising the following steps:
capturing an image of the ground on which an agricultural machine moves by means of a camera mounted on the spray boom;
determining, in real time, information regarding the distance of said camera from the ground using information supplied by a measuring system;
receiving the ground image taken by said camera and said information regarding the distance of said camera from the ground;
identifying in said ground image, by processing said image, a target plant to be treated;
determining information regarding the direction of observation of said target plant in said image;
determining, from said information regarding the direction of observation, at least one spray nozzle selected for spraying an agricultural product onto the target plant and, from the information regarding the distance of the camera from the ground, a time at which the or each selected spray nozzle has to be activated in order to spray the agricultural product onto the target plant, wherein the activation time ($t2$) of a nozzle located directly over a target plant to be treated is determined based on the following formula:

$$t2 = t1 + d/S$$

where
$t1$ is the time that the shot of the image containing the target plant is taken,
$d$ is the horizontal distance between the target plant and the vertical projection of the nozzle, determined from the direction of observation of the target plant, the current height $h$ of the camera with respect to the ground and information regarding the relative position between the camera and the nozzle,
and $S$ is the speed of movement of the boom.

15. An agricultural machine including:
a spray boom comprising:
a bar extending in a lateral direction (Lat); and
a plurality of spray nozzles mounted on the bar and distributed in the lateral direction (Lat); and
a control system according to claim 1, wherein:
the cameras and the distance measuring system are secured to the bar of the spray boom; and
the processing unit communicates with the plurality of spray nozzles of the spray boom in order to transmit, during operation, the activation command suitable for being received by the plurality of spray nozzles in order to trigger the spraying of the agricultural product onto said at least one target plant.

16. The method according to claim 14, wherein the line of sight of the camera is oriented obliquely down toward the front of the machine.

17. The method according to claim 14, wherein the line of sight of the camera is oriented vertically.

18. The agricultural machine according to claim 15, wherein each camera is associated with a particular given subset of the plurality of nozzles.

* * * * *